United States Patent
Song

(10) Patent No.: US 9,988,532 B2
(45) Date of Patent: Jun. 5, 2018

(54) FLAME RETARDANT THERMOPLASTIC ELASTOMERS

(71) Applicant: PolyOne Corporation, Avon Lake, OH (US)

(72) Inventor: Chang Hoon Song, Lawrenceville, GA (US)

(73) Assignee: PolyOne Corporation, Avon Lake, OH (US)

( * ) Notice: Subject to any disclaimer, the term of this patent is extended or adjusted under 35 U.S.C. 154(b) by 217 days.

(21) Appl. No.: 14/786,847

(22) PCT Filed: Apr. 18, 2014

(86) PCT No.: PCT/US2014/034585
§ 371 (c)(1),
(2) Date: Oct. 23, 2015

(87) PCT Pub. No.: WO2014/176119
PCT Pub. Date: Oct. 30, 2014

(65) Prior Publication Data
US 2016/0075874 A1    Mar. 17, 2016

Related U.S. Application Data

(60) Provisional application No. 61/816,095, filed on Apr. 25, 2013.

(51) Int. Cl.
| | | |
|---|---|---|
| C08L 71/12 | (2006.01) | |
| H01B 7/295 | (2006.01) | |
| C08L 53/02 | (2006.01) | |
| H01B 3/30 | (2006.01) | |
| H01B 3/42 | (2006.01) | |
| C08K 5/5313 | (2006.01) | |
| C08K 5/3475 | (2006.01) | |
| C08K 5/3492 | (2006.01) | |

(52) U.S. Cl.
CPC ............ *C08L 71/12* (2013.01); *C08L 53/025* (2013.01); *H01B 3/308* (2013.01); *H01B 3/427* (2013.01); *C08K 5/3475* (2013.01); *C08K 5/34926* (2013.01); *C08K 5/5313* (2013.01)

(58) Field of Classification Search
USPC .................................................. 524/91, 133
See application file for complete search history.

(56) References Cited

U.S. PATENT DOCUMENTS

| | | | |
|---|---|---|---|
| 4,959,412 A | 9/1990 | After et al. | |
| 5,455,292 A | 10/1995 | Kakegawa et al. | |
| 5,705,556 A | 1/1998 | Djiauw et al. | |
| 5,807,915 A | 9/1998 | Chu et al. | |
| 5,910,526 A | 6/1999 | Chu et al. | |
| 5,965,251 A | 10/1999 | Namura et al. | |
| 6,255,371 B1 | 7/2001 | Schlosser et al. | |
| 6,503,993 B1 | 1/2003 | Huovinen et al. | |
| 6,576,700 B2 | 6/2003 | Patel | |
| 6,809,159 B2 | 10/2004 | Adedeji | |
| 6,838,503 B2 | 1/2005 | Yin et al. | |
| 7,005,465 B2 | 2/2006 | Sato | |
| 7,211,639 B2 | 5/2007 | Yeager et al. | |
| 7,217,885 B2 | 5/2007 | Mhetar et al. | |
| 7,220,917 B2 | 5/2007 | Mhetar et al. | |
| 7,332,677 B2 | 2/2008 | Xu et al. | |
| 7,435,776 B2 | 10/2008 | Gu et al. | |
| 7,504,585 B2 | 3/2009 | Harada et al. | |
| 7,544,728 B2 | 6/2009 | Ishii et al. | |
| 7,576,150 B2 | 8/2009 | Klei et al. | |
| 7,585,906 B2 | 9/2009 | Klei et al. | |
| 7,589,281 B2 | 9/2009 | Qiu et al. | |
| 7,622,522 B2 | 11/2009 | Qiu et al. | |
| 7,655,714 B2 | 2/2010 | Qiu et al. | |
| 7,678,852 B2 | 3/2010 | Kaprinidis | |
| 7,741,564 B2 | 6/2010 | Mhetar et al. | |
| 7,776,441 B2 | 8/2010 | Mhetar et al. | |
| 7,790,790 B2 | 9/2010 | Karayianni et al. | |
| 7,842,747 B2 | 11/2010 | Gu et al. | |
| 8,129,451 B2 | 3/2012 | Tomiyama | |
| 8,278,376 B2 | 10/2012 | Qiu et al. | |
| 8,563,131 B2 | 10/2013 | Mhetar et al. | |
| 8,658,898 B2 | 2/2014 | Horiuchi | |
| 8,901,214 B2 | 12/2014 | Araki et al. | |
| 9,120,923 B2 | 9/2015 | Kim | |
| 9,187,640 B2 | 11/2015 | Furukawa et al. | |
| 2003/0082362 A1 | 5/2003 | Khandpur et al. | |
| 2003/0175488 A1* | 9/2003 | Asthana | B29C 45/14811 428/212 |

(Continued)

FOREIGN PATENT DOCUMENTS

| | | |
|---|---|---|
| JP | 1119971 A | 7/1999 |
| JP | 2010118207 A | 5/2010 |

(Continued)

OTHER PUBLICATIONS

Hangzhou JLS Flame Retardants Chemical Co., Ltd.: Material Data Safety Sheet, JLS-APP Version 05.0, Revision Date Mar. 18, 2009.

*Primary Examiner* — Mark Kaucher
*Assistant Examiner* — Henry Hu
(74) *Attorney, Agent, or Firm* — Michael J. Sambrook; John H. Hornickel

(57) ABSTRACT

A flame-retardant thermoplastic elastomer compound includes polyphenylene ether, a hydrogenated styrene block copolymer, at least one solid non-halogenated phosphorus containing flame retardant, a nucleated olefinic polymer, two different specific UV stabilizers, and pigment. The compound has a before-aging tensile elongation of >200% and an after-aging tensile elongation residual of at least 75% according to UL 62. The compound is useful for making an insulation layer, a jacketing layer, or both for protected electrical lines such as alternating current wire and cable products, accessory cables, and a variety of injection molded electrical or electronic parts.

17 Claims, No Drawings

(56) References Cited

U.S. PATENT DOCUMENTS

| | | | |
|---|---|---|---|
| 2005/0197464 A1 | 9/2005 | Handlin, Jr. et al. | |
| 2008/0193755 A1* | 8/2008 | Guise | B29C 47/0016 |
| | | | 428/379 |
| 2008/0251271 A1 | 10/2008 | Jeyakumar et al. | |
| 2009/0093584 A1 | 4/2009 | Gelles et al. | |
| 2010/0012373 A1 | 1/2010 | Guo et al. | |
| 2011/0196080 A1* | 8/2011 | Matsuoka | C08L 77/00 |
| | | | 524/210 |
| 2012/0037396 A1* | 2/2012 | Gu | H01B 7/295 |
| | | | 174/110 AR |
| 2013/0280532 A1 | 10/2013 | Balfour et al. | |
| 2014/0133812 A1 | 5/2014 | Kimura et al. | |
| 2014/0171575 A1* | 6/2014 | Mercx | C08K 3/22 |
| | | | 524/433 |

FOREIGN PATENT DOCUMENTS

| | | |
|---|---|---|
| WO | 2004011504 A2 | 2/2004 |
| WO | 2010030478 A2 | 3/2010 |

* cited by examiner

FLAME RETARDANT THERMOPLASTIC ELASTOMERS

CLAIM OF PRIORITY

This application claims priority from U.S. Provisional Patent Application Ser. No. 61/816,095 filed on Apr. 25, 2013, which is incorporated by reference.

FIELD OF THE INVENTION

This invention relates to thermoplastic elastomers, polymer compounds which exhibit elasticity while remaining thermoplastic, which are flame retardant, resistant to ultraviolet light, and contain polyphenylene ether.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers.

Thermoplastic elastomers presently are prepared from fossil-fuel derived polymer resins, such as styrene block copolymers (SBCs), thermoplastic vulcanizates (TPV), thermoplastic olefins (TPO), copolyesters (COPE), thermoplastic urethanes (TPU), copolyamide (COPA), and most recently olefin block copolymers (OBCs).

Recently thermoplastic elastomers have included polyphenylene ether (PPE). Two examples are found in U.S. Pat. No. 6,838,503 (Yin et al.) and U.S Pat. No. 7,005,465 (Sato). But the formulations disclosed in these two patents apparently do not have sufficient elongation to satisfy Underwriters' Laboratory Test 62 (UL 62), which requires, among other things, more than 200% tensile elongation before aging and retention of more than 75% of that tensile elongation after aging at 121° C. for 168 hours or preferably at 136° C. for 168 hours.

More recently, an excellent thermoplastic elastomer compound has been disclosed in United States Patent Application Publication No. 20120037396 (Gu), which is incorporated by reference herein. The flame-retardant thermoplastic elastomer compound so disclosed has polyphenylene ether, a hydrogenated styrene block copolymer, at least one solid non-halogenated phosphorus containing flame retardant, and a nucleated olefinic polymer. The TPE compound has a before-aging tensile elongation of >200% and an after-aging tensile elongation residual of at least 75%, according to the UL 62 test, which makes it useful as an insulation layer, a jacketing layer, or both for protected electrical lines such as alternating current wire and cable products, accessory cables, and variety of injection molded electrical or electronic parts. The TPE compound was suitable for interior uses.

SUMMARY OF THE INVENTION

The art needs a TPE made from PPE which is resistant to ultraviolet (UV) light and which also passes the entire requirements of the UL 62 test, especially with respect to tensile elongation (a) before and (b) after undergoing thermal aging as described above, (c) a wire and cable deformation of less than 50% after undergoing weighted, thermal aging at 150° C. for one hour, and (d) the VW-1 vertical cable burn.

The present invention has found a unique combination of ingredients to make a non-halogen, non-red phosphorous flame retardant TPE containing PPE which passes all parts of the UL 62 test.

Significantly, the flame retardant can be non-halogen and still satisfy all parts of the UL 62 test. It has been found that the thermoplastic elastomer of the present invention can be flexible, stretchy, flame retardant without halogens or red phosphorus, and soft.

Even more specifically, the non-halogenated flame retardant can be solid particles which are not sensitive to water, which is important for underwater resistivity of plastic articles made from the TPE and provide long term flame retardant properties and continued good mechanical properties in the presence of water or high humidity. Also, solid particle flame retardants used for this invention have no negative effect on the elasticity of the TPE.

The TPEs of the present invention have a good surface appearance, can be made at high extrusion speeds comparable to what is used for polyvinyl chloride (PVC) wire and cable insulation and jacketing (even using the same screw design as used for PVC production), and can pass the even more stringent European Union 70° C./48 hr underwater insulation resistance requirement. The TPEs also have excellent underwater thermal aging which requires endurance after underwater exposure to 70° C. for 168 hours.

The present invention solves the problem of finding a commercially practical non-halogenated flame retardant TPE made from PPE which is flexible, durable, and has a before-aging tensile elongation of >200% and an after-aging tensile elongation residual of more than 75%, passes 150° C. deformation test and VW-1 flame test among other testing requirements according to the UL 62 test. This new TPE passes the tests sufficient to be useful as insulation, jacketing, or both for wire and cable, including especially alternating current (AC) wire and cable insulation and jacketing.

"Wire and cable" is an industry term for a line of axial length which conducts electricity or other electromagnetic signals and is protected by electric insulation layers, jacketing layers, or both. Therefore, whether in the form of wire or in the form of cable, the term "protected electrical line" will be used to denote either or both.

Because the TPE compound contains PPE, it has been found that the TPE is very sensitive to ultraviolet light exposure, for even one day. This sensitivity can limit the possible uses of the TPE despite its other advantages. Thus, the addition of some combination of UV stabilizer additives, preferably by delivery during production as a masterbatch, was attempted. After several failures using conventional ingredients, an unpredictable combination of UV stabilizers was found.

One aspect of the invention is a thermoplastic elastomer compound, comprising from about 10 to about 60 weight percent of a polyphenylene ether; from about 10 to about 60 weight percent of a hydrogenated styrenic block copolymer; from about 5 to about 30 weight percent of at least one solid non-halogen flame retardant selected from the group consisting of organo-phosphinate, melamine polyphosphate, and combinations thereof; from about 5 to about 40 weight percent of a nucleated olefinic polymer; from about 1 weight percent to an effective amount of Phenol, 2,2'-methylene-bis(6-(2H-benzotriazol-2-yl)-4-(1,1,3,3-tetramethylbutyl)); from about 1 weight percent to an effective amount of Poly[[6-[(1,1,3,3-tetramethylbutyl)amino]-1,3,5-triazine-2, 4-diyl][(2,2,6,6-tetramethyl-4-piperidinyl)imino]-1,6-hexanediyl[(2,2,6,6-tetramethyl-4-piperidinyl)imino]]); and pigment.

Another aspect of the invention is a plastic article molded or extruded from the TPE of the present invention.

Another aspect of the invention is a protected electrical line, comprising (a) wire or cable having an axial length and (b) at least one layer of the TPE of the present invention enveloping at least a portion of the axial length of the wire or cable, wherein the protected electrical line is resistant to UV light as measured by less than 1 Delta E color variation after 10 days of QUV testing according to ASTM D4587 (UVA, 340 nm, 0.77 watt/m$^2$, 60° C. for 8 hours light and 50° C. for 4 hours dark condensation).

Features of the invention will become apparent with reference to the following embodiments.

EMBODIMENTS OF THE INVENTION

Polyphenylene Ether

PPE, also known as poly(2,6-dimethylphenol), is a well known thermoplastic resin marketed commercially by a variety of companies.

As explained by Yin et al., non-limiting examples of types of PPE can include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly(2,6-dibenzyl-1,4-phenylene ether), poly(2,5-dimethyl-1,4-phenylene ether), and combinations thereof.

Commercial PPE resins are often a blend of polyphenylene ether with an aromatic vinyl group thermoplastic resin.

Also as explained by Yin et al., non-limiting examples of the aromatic vinyl group thermoplastic resin can include homopolymers of styrene or its derivatives, as well as copolymers of styrene and p-methyl styrene, alpha-methyl styrene, alpha-methyl-p-methyl styrene, chlorostyrene, bromostyrene, etc. The rubber-modified polystyrene (HIPS) formed from 70 to 99% by weight of aromatic vinyl compound mentioned above and 1 to 30% by weight of diene rubber, can also be used. Examples of the diene rubber used in HIPS include homopolymers of conjugated diene group compounds such as butadiene, isoprene, chloroprene, etc.; copolymers of conjugated diene group compounds and unsaturated nitro compounds or aromatic vinyl compounds; as well as natural rubber, etc. These can be used in the form of one type or in the form of mixture of two or more than two types. Poly butadiene-butadiene-styrene copolymer is often preferred. HIPS can be obtained by methods such as emulsification polymerization, suspension polymerization, lump state polymerization, solution polymerization, or by combining these methods. Additional examples of aromatic vinyl group resins include styrene-acrylonitrile-acrylate copolymer, FPDM group rubber-modified polystyrene, acrylate rubber-modified styrene-acrylonitrile copolymer and others.

Virtually any commercial PPE is a candidate for use in this invention, over a wide range of molecular weights. Of the various commercially available PPEs, two are already known to be useful. One is Blendex 820 brand sold by Chemtura and is not a blend of PPE with another polymer. The other is Bluestar brand PPE sold by Bluestar of Yuncheng, China. It also is not a blend.

Thermoplastic Elastomer

Because PPE is generally brittle or at least more brittle than can be tolerated for wire and cable uses, a thermoplastic elastomer is needed to add flexibility to the PPE.

Any commercial thermoplastic elastomer fundamentally is a candidate for use to render the PPE more flexible. Styrene block copolymers (SBC) as a class are acceptable for making the TPE more flexible. Preferably, a highly hydrogenated SBC is used. Non-limiting examples of highly hydrogenated SBCs include styrene-ethylene butylene-styrene polymers, styrene-ethylene propylene-styrene polymers, hydrogenated styrene-isoprene block copolymers, and hydrogenated styrene-butadiene block copolymers, and combinations of them.

The preferred thermoplastic elastomer is a styrenic block copolymer, more preferably one which is hydrogenated such as styrene-ethylene-butylene-styrene (SEBS) or styrene-ethylene-ethylene-propylene-styrene (SEEPS) in a variety of grades.

There are two types of thermoplastic elastomers useful for this invention: those which require the presence of plasticizing oil and those which do not.

The first type of hydrogenated TPE which requires plasticizing oil should have a weight average molecular weight of between about 70,000 and about 160,000 with a preferred molecular weight of about 100,000. The ratio of styrenic end-block to olefinic mid-block should range from about 20/80 to about 40/60, and preferably about 30/70.

The second type of hydrogenated TPE which does not require plasticizing oil should have a weight average molecular weight of less than about 230,000 and styrenic end-block content of less than about 22%. Also, the mid-block can have a relatively higher vinyl content than typical SEBS TPEs.

Hydrogenated styrene block copolymers are commercially available from a number of sources, preferably the Kraton G brand series from Kraton Polymers. Of the various G grades, Kraton G1642, Kraton G1643 (for non-oil formulations), Kraton G1650, Kraton G1652, and Kraton G1654H are desirable. Also Kraton MD6945 SEBS (for non-oil formulations) is useful. Also Septon 4033 SEEPS, which has a similar molecular weight and size of styrenic end-blocks as Kraton G1650, and Kuraray Q1250, a proprietary block copolymer with a different endblock than styrene, can be used.

Solid Non-Halogenated Flame Retardant

The TPE for use as wire and cable insulation or jacketing or both must be flame retardant to satisfy building requirements and codes for mammalian-occupied spaces.

The marketplace in recent years has preferred to use non-halogenated flame retardants because in a fire such flame retardants do not release chlorine-containing compounds or bromine-containing compounds.

One type of non-halogenated flame retardant is red phosphorus or chemicals containing red phosphorus. This type is also currently discouraged in the market and in building requirements and codes.

Therefore, to avoid both halogenated flame retardants and red phosphorus, the TPEs of the present invention employ either organo-phosphinates or melamine polyphosphates or both. These two types of flame retardants are solid particles which are particularly suitable for use in the TPE compounds of the present invention because they are far less likely to migrate within the compound after it has been finally formed into a plastic article such as a sleeve of insulation or jacketing for a wire or a cable. Also as explained above, these two types of solid non-halogenated flame retardants contribute to underwater resistivity, durability in high humidity conditions, etc.

Organo-phosphinate is commercially available as a proprietary compound from Clariant Corporation marketed under the brands Exolit OP 930, Exolit OP 935, Exolit OP 1311, Exolit OP 1312, and Exolit OP 1230.

These organo-phosphinates are also useful as synergists for other flame retardant materials, such as melamine polyphosphate or polyammonium polyphosphate or proprietary equivalent performers such as Amfine FP-2100J from Amfine Chemical Corporation. Each of these latter flame retardant materials alone is not very effective at low concentration in the TPE formulation, but a blend of the organo-phosphinate in a small amount with any of them is very effective for flame retardancy even if the total concentration of flame retardants remains minor.

It is believed that a combination of organo-phosphinate and melamine polyphosphate offers the best performance at reasonable cost in wire and cable insulation or jacketing when striving to pass the underwater thermal aging test and underwater insulation resistance test because neither of the chemicals is overtly sensitive to water.

Melamine polyphosphate is commercially available both from Hangzhou JLS Flame Retardants Chemicals Co., Hangzhou Zhejiang, China as JLS-PNA and JLS-PNB brand flame retardant additives and from Ciba Specialty Chemicals as Melaspur 200 brand flame retardant additive.

Flame retardants of polyammonium polyphosphate (APP) or a blend including polyammonium polyphosphate are commercially available both from Hangzhou JLS Flame Retardants Chemicals Co. as APP, PNP1C, and PNP1D brand flame retardant additives and from Clariant as Exolit AP422, Exolit AP 462, Exolit AP760, and Exolit AP766 brand flame retardant additives. Another major APP supplier is Budenheim of Germany. Amfine FP-2100J and FP-2200 are proprietary nitrogen-phosphorous based flame retardant products from Amfine Chemical Corporation.

One of the disadvantages of the TPE compounds disclosed by Yin et al. and Sato is that their compound apparently does not have a tensile elongation before aging of more than 200% and did not report performance of 150° C. heat deformation or tensile elongation retention after thermal aging, these properties being required by the UL 62 safety standard. While not limited to a particular theory, it is believed that the use by Yin et al. and Sato of liquid non-halogenated flame retardant(s) is at least a contributing factor to the failure to have a tensile elongation before aging of more than 200%.

Nucleated Olefinic Polymer

The TPE of the present invention benefits from an amount of nucleated olefinic polymer, preferably a nucleated polypropylene homopolymer, to assist in processing of the TPE into its final shape and to contribute to the 150° C. heat deformation heat resistance of the plastic article made from the TPE. Any commercially available nucleated olefinic polymer is a candidate for use in the TPE. A commercial example of a nucleated polypropylene homopolymer is Formolene 5144L brand polypropylene from Formosa Plastics. A second example is a nucleated homo-polypropylene PP1043N (5 Melt Flow Index) from ExxonMobil.

Tackifier

A tackifier, also known as a midblock SBC modifier, is also used in the TPE. Any commercially available tackifier is a candidate for use in the TPE. Non-limiting examples of tackifiers include Escorez 5000 series tackifiers, such as Grades 5340 and 5320 from ExxonMobil Chemicals; Regalite R1125, Regalite R1100, Regalrez 1139, Regalrez 1126, Regalrez 1094, Plastolyn R1140, Eastotac H 140-W, and Eastotac H125-W tackifiers from Eastman Chemicals; and Arkon P100, Arkon P115, Arkon P125, and Arkon P140A tackifiers from Arakawa Chemicals. Presently preferred as a tackifier is Plastolyn R1140 tackifier from Eastman Chemicals.

Ultraviolet Light Stabilizer

The specific UV light stabilizers found unexpectedly to work well together in the present invention are:

Phenol, 2,2'-methylene-bis(6-(2H-benzotriazol-2-yl)-4-(1,1,3,3-tetramethylbutyl)) (Tinuvin™ 360 very low volatile benzotriazole UV absorber from BASF); and Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (Chimassorb™ 944 FDL (Beads) Oligomeric Hindered Amine Light Stabilizer (HALS) from BASF).

Optional Antioxidant

Additionally and optionally, an antioxidant can be used in an amount of less than 1 weight percent and preferably about 0.05 weight percent, namely: Amines, bis(hydrogenated tallow alkyl), oxidized / PHENOL, 2,4-BIS(1,1-DIMETHYLETHYL)-, PHOSPHITE (3:1) (Irgastab™ FS 301FF Phenol free processing stabilizer system from BASF).

Optional Oil

As stated above, depending on the type of hydrogenated styrenic block copolymer used, plasticizing oil may be necessary to improve flow and flexibility of the resulting TPE. Any oil conventionally used to plasticize a SBC is a candidate for use, such as mineral oil, vegetable oil, synthetic oil, etc. A presently preferred oil is Drakeoil 600 brand oil from Drake Oil Co. of Syracuse, New York, USA.

Other Optional Additives

The thermoplastic elastomer compounds of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; lubricants; micas; pigments, colorants and dyes; oils and plasticizers; processing aids; other polymers; release agents; silanes, titanates and zirconates; slip and anti-blocking agents; stabilizers; stearates; tackifiers; viscosity regulators; waxes; and combinations of them.

Table 1a, for SBC which requires plasticizing oil, shows the acceptable, desirable, and preferable ranges of ingredients for the thermoplastic elastomer compound of the present invention, (so long as the particular combination results in a TPE which has an elongation of more than 200%). Table 1b, for SBC which does not require plasticizing oil, shows those same three ranges for the thermoplastic elastomer compound.

TABLE 1a

Ranges of Ingredients

| Ingredient (Wt. Percent) | Acceptable | Desirable | Preferable |
|---|---|---|---|
| Polyphenylene Ether (blended or unblended) | 10-50 | 15-40 | 20-35 |
| Hydrogenated Styrenic Block Copolymer (requiring oil) | 10-50 | 15-45 | 20-40 |
| Solid, Non-Halogenated Flame Retardant | 5-30 | 5-25 | 10-20 |
| Nucleated Olefinic Polymer | 5-30 | 5-25 | 5-20 |
| Oil | 5-30 | 5-25 | 5-20 |
| Tackifier | 5-25 | 5-20 | 5-15 |
| UV Light Stabilizer | 1-4 | 1-2 | 1.2-1.3 |
| Titanium Dioxide Pigment | 2-10 | 3-8 | 3.5-7 |
| Other Additives | 0-5 | 0.5-2 | 0.7-1.5 |

TABLE 1b

Ranges of Ingredients

| Ingredient (Wt. Percent) | Acceptable | Desirable | Preferable |
|---|---|---|---|
| Polyphenylene Ether (blended or unblended) | 10-60 | 15-50 | 20-50 |
| Hydrogenated Styrenic Block Copolymer (not requiring oil) | 20-60 | 25-55 | 30-50 |
| Solid, Non-Halogenated Flame Retardant | 5-30 | 5-25 | 10-20 |
| Nucleated Olefinic Polymer | 5-40 | 5-35 | 10-30 |
| UV Light Stabilizer | 1-4 | 1-2 | 1.2-1.3 |
| Titanium Dioxide Pigment | 2-10 | 3-8 | 3.5-7 |
| Optional Oil | 0-10 | 0-7 | 0-5 |
| Tackifier | 0-20 | 0-10 | 0-5 |
| Other Additives | 0-5 | 0.5-2 | 0.7-1.5 |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 300 to about 700 revolutions per minute (rpm), and preferably from about 500 rpm. Typically, the output from the extruder is pelletized for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

Usefulness of the Invention

Any plastic article needing flexibility, elongation, flame retardance, UV resistance, and the physical properties of PPE can benefit from TPEs of the present invention. Preferably, any plastic article which employs flexible polyvinyl chloride compounds can now be served by TPEs of the present invention.

The TPEs can be especially useful as insulation or jacketing layers or both used with protected electrical line (wire or cable or both) which requires flame retardant properties and sufficient physical properties to pass the UL 62 safety standard. Electrical power wires and cables fit this category. With the UV resistance added to the TPE compounds, the compounds in the final shape can be used in circumstances where there is continuing exposure to ultraviolet light.

Alternatively, because it has been found that TPE compounds of the present invention also pass the VW-1 and V-0 flame tests, they are also suitable as insulation or jacketing layers for accessory wire or accessory cable that need not meet all parts of the UL 62 safety standard.

Moreover, other plastic articles which need strong physical properties arising from PPE and non-halogenated flame retardance can benefit from TPE compounds of this invention. Such plastic articles are typically injection molded into precise electrical or electronic parts, such as connectors, junction boxes, etc.

EXAMPLES

All Examples of United States Patent Application Publication No. 20120037396 (Gu) are expressly incorporated by reference herein. This invention used one embodiment from the Gu Patent Application Publication No. 20120037396, a TPE compound, branded as LC370-195 grade TPE from PolyOne Corporation. Without undue experimentation, a person having ordinary skill in the art can utilize the UV resistance improvements of this invention with any of the embodiments identified or contemplated in the Gu Patent Application Publication No. 20120037396.

Table 2 shows sources of ingredients for the examples of UV light resistance. Table 3 shows the formulations of the masterbatches of UV light stabilizers to be later combined with the LC370-195 grade TPE described above. The performance requirement for success was less than 1.0 Delta E variation after 10 days of exposure to QUV light testing, according to the procedures and equipment specified in ASTM D4587 (UVA, 340 nm, 0.77 watt/m$^2$, 60° C. for 8 hours light and 50° C. for 4 hours dark condensation).

The masterbatches were made by 25mm twin screw extrustion with the barrel and die temperatures ranged from 170° C. (338° F.) to 180° C. (356° F.) with the melt temperature of 196° C. (382° F.). The pre-mixing was performed with a Sack Mixer to get the uniform distribution of the additives with mild mixing speed for one minute. A 20/60/20 screen pack was used to generate back pressure and improve the dispersion quality. The vacuum was applied in one of the barrel zones to remove volatiles during extrusion.

The molded chips for QUV testing were made by injection molding with the temperature setup rangeing from 160° C. (320° F.) to 190° C. (374° F.). The mold temperature was maintained as cool with water circulation. The mold chip dimension was 6.35 cm×8.89 cm (2.5 inch×3.5 inch) with a set of stepwise thicknesses that was 0.15 cm (60 mil) at the top of the mold chip and 0.076 cm (30 mil) thickness at the bottom of the mold chip. The masterbatches were pre-blended with the FR TPE by a bag shaking and fed into the injection molding hopper. The color reading was performed on the flat side of the mold chips (the side opposite the side having different thickness dimensions identified above) before and after QUV testing.

TABLE 2

Ingredients

| Chemical Name or Description | Purpose | Commercial Source |
| --- | --- | --- |
| 1% Areosperse black pigment + 99% Ethylene Bis Stearamide Wax | Black pigment in Wax | PolyOne |
| 3,5-di-t-Butyl-4-Hydroxybenzoic Acid, Hexadecyl Ester (Cyasorb UV-2908) | Light Stabilizer | Cytec |
| 4-piperidol,2,2,6,6- tetramethyl- RPW stearin (fatty acids mixture) (Cyasorb UV 3853S) | Hinder Amine Light Stabilizer | Cytec |
| Amines, bis(hydrogenated tallow alkyl), oxidized/ PHENOL, 2,4-BIS(1,1-DIMETHYLETHYL)-, PHOSPHITE (3:1) (Irgastab FS 301FF) | Phenol free processing stabilizer system/Antioxidant | BASF |
| Bis(2.4-di-tert-butylphenyl) pentaerythritol diphosphite (Songnox 6260 PW) | Stabilizer/Antioxidant | Songwon |
| Phenol, 2,2'-methylene-bis(6-(2H-benzotriazol-2-yl)-4-(1,1,3,3-tetramethylbutyl)) (Tinuvin 360) | Very low volatile benzotriazole UV absorber | BASF |
| Phenol, 2-(2H-benzotriazol-2-yl)-4,6-bis(1-methyl-1-phenylethyl) (Tinuvin 234) | Very low volatile benzotriazole UV absorber | BASF |
| Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (Chimassorb 944 FDL (Beads)) | Oligomeric Hindered Amine Light Stabilizer (HALS) | BASF |
| Polypropylene (PROFAX 6301 PP FLAKE) | Carrier Resin | Basell |
| Sodium Alumino Sulphosilicate Blue Pigment Blue 29 | Blue Pigment | NUBIOLA USA |
| Sodium Aluminosilicate Violet Pigment Violet 15 (Nubix V-8) | Violet Pigment | NUBIOLA USA |
| Substituted Amine Oligomer (Cyasorb UV-3529) | Light Stabilizer | Cytec |
| Substituted Heterocycle of S-Triazine Class (Cyasorb UV 1164) | Light Absorber | Cytec |
| Titanium Dioxide (Tiona 696) | Weatherable White pigment | CRISTAL INORGANIC CHEMICALS SWITZERLAND |
| Titanium Dioxide (Tronox 470) | White pigment | HUNTSMAN TIOXIDE/CRISTAL INORGANIC CHEMICALS SWITZERLAND |
| Tris (4-t-butyl-3-hydroxy-2,6-dimethylbenzyl)-s-triazine-2,4,6-(1H,3H, 5H)-trione (Cyanox 1790) | Antioxidant | Cytec |
| Tris(2,4-di-tert-butylphenyl) phosphite/ Tetrakis[methylene(3,5-di-tert-butyl-4-hydroxyhydrocinnamate)] methane (Songnox 11B PW) | Antioxidant/Stabilizer | Songwon |

TABLE 3

Masterbatch Formulations

| Ingredients | M-1 | M-2 | M-3 | M-4 | M-5 | M-6 |
| --- | --- | --- | --- | --- | --- | --- |
| Titanium Dioxide (Tronox 470) | 50 | | | | | |
| Titanium Dioxide (Tiona 696) | | 50 | 50 | 50 | | 36.71 |
| Sodium Aluminosilicate Violet Pigment Violet 15 (Nubix V-8) | 1.8 | 1.8 | 1.8 | 1.8 | | 1.62 |
| 1% Areosperse black pigment + 99% Ethylene Bis Stearamide Wax | 0.5 | 0.5 | 0.5 | 0.5 | | 0.44 |
| Sodium Alumino Sulphosilicate Blue Pigment Blue 29 | 0.94 | 0.94 | 0.94 | 0.94 | | 0.66 |
| Amines, bis(hydrogenated tallow alkyl), oxidized/PHENOL, 2,4-BIS(1,1-DIMETHYLETHYL)-, PHOSPHITE (3:1) (Irgastab FS 301FF) | | | | | 0.72 | 0.42 |
| Phenol, 2,2'-methylene-bis(6-(2H-benzotriazol-2-yl)-4-(1,1,3,3-tetramethylbutyl)) (Tinuvin 360) | | | 8.57 | | 17.14 | 10 |
| Phenol, 2-(2H-benzotriazol-2-yl)-4,6-bis(1-methyl-1-phenylethyl) (Tinuvin 234) | | | | 4.29 | | |
| Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (Chimassorb 944 FDL (Beads)) | | | 8.57 | 4.29 | 17.14 | 10 |
| Tris(2,4-di-tert-butylphenyl)phosphite/ Tetrakis[methylene(3,5-di-tert-butyl-4-hydroxyhydrocinnamate)] methane (Songnox 11B PW) | | | 2.85 | 1.43 | | |
| Bis(2.4-di-tert-butylphenyl) pentaerythritol diphosphite (Songnox 6260 PW) | 2.14 | 2.86 | | | | |
| Tris (4-t-butyl-3-hydroxy-2,6-dimethylbenzyl)-s-triazine-2,4,6-(1H,3H,5H)-trione (Cyanox 1790) | 0.71 | | | | | |
| Substituted Heterocycle of S-Triazine Class (Cyasorb UV 1164) | 5.71 | 5.71 | | | | |

TABLE 3-continued

Masterbatch Formulations

| Ingredients | M-1 | M-2 | M-3 | M-4 | M-5 | M-6 |
|---|---|---|---|---|---|---|
| Substituted Amine Oligomer (Cyasorb UV-3529) | 5.71 | 5.71 | | | | |
| 4-piperidol,2,2,6,6- tetramethyl- RPW stearin (fatty acids mixture) (Cyasorb UV 3853S) | 5.71 | 7.14 | | | | |
| 3,5-di-t-Butyl-4-Hydroxybenzoic Acid, Hexadecyl Ester (Cyasorb UV-2908) | | 2.86 | | | | |
| Polypropylene (PROFAX 6301 PP FLAKE) | 26.78 | 22.48 | 26.77 | 36.75 | 65 | 40.15 |
| | 100 | 100 | 100 | 100 | 100 | 100 |

TABLE 4

TPE Compound Formulations and Test Results

| Weight Percent | A | B | C | D | E | F | 1 | G | 2 |
|---|---|---|---|---|---|---|---|---|---|
| LC370-195 TPE (PolyOne) | 100 | 93 | 93 | 93 | 93 | 86 | 86 | 93 | 88 |
| M-1 | | 7 | | | | | | | |
| M-2 | | | 7 | | | | | | |
| M-3 | | | | 7 | | | 14 | | |
| M-4 | | | | | 7 | 14 | | | |
| M-5 | | | | | | | | 7 | |
| M-6 | | | | | | | | | 12 |
| Total | 100 | 100 | 100 | 100 | 100 | 100 | 100 | 100 | 100 |
| Wt. % of Tinuvin 360 | | | | | | | 1.2 | 1.2 | 1.2 |
| Wt. % of Chimassorb 944 FDL | | | | | | | 1.2 | 1.2 | 1.2 |
| QUV After Day 1 | 5.85 | No Data | 3.27 | 0.23 | 0.32 | 0.23 | 0.62 | 5.26 | 0.98 |
| QUV After Day 2 | 6.02 | 3.30 | No Data | 0.63 | 1.48 | 0.38 | 0.60 | 3.46 | 0.76 |
| QUV After Day 3 | 9.45 | 4.57 | No Data | 2.79 | 2.66 | 0.99 | No Data | 4.24 | 0.73 |
| QUV After Day 4 | 12.56 | No Data | No Data | 3.74 | 4.56 | 1.91 | 0.72 | 4.04 | 0.63 |
| QUV After Day 5 | No Data | No Data | No Data | 1.83 | 5.52 | 2.46 | 0.25 | No Data | No Data |
| QUV After Day 6 | No Data | No Data | No Data | 2.41 | 6.79 | 3.35 | 0.41 | No Data | No Data |
| QUV After Day 7 | 18.68 | No Data | No Data | 2.42 | 8.10 | 3.95 | 0.29 | 6.82 | 0.72 |
| QUV After Day 8 | 20.53 | No Data | No Data | 2.99 | 9.12 | 4.76 | 0.21 | 7.63 | 0.66 |
| QUV After Day 9 | 21.00 | No Data | No Data | No Data | No Data | No Data | | 7.43 | 0.46 |
| QUV After Day 10 | 21.67 | 8.41 | No Data | No Data | No Data | No Data | | No Data | 0.88 |

Eight different TPE compound formulations were tested before one of UV stabilizer masterbatches was found to satisfy the requirement of less than 1 Delta E variation after 10 days of continuous QUV exposure according to the requirements of ASTM D4587 (UVA, 340 nm, 0.77 watt/m$^2$, 60° C. for 8 hours light and 50° C. for 4 hours dark condensation).

Comparative Example A was a control with no UV stabilizer masterbatch added. Its performance after even one day was unsatisfactory and after 10 days was horrible.

Comparative Examples B and C, using masterbatches M-1 and M-2 at a letdown ratio of 7%, were all failures, despite the selection of conventional UV stabilizers such as the Cyasorb™ UV stabilizers and the Cyanox™ UV stabilizer.

Comparative Example D and Example 1 introduced the use of Tinuvin 360 UV stabilizer and Chimassorb 944 FDL UV stabilizer. While Comparative Example D was insufficient in amount because of its letdown ratio of 7% (resulting in the Tinuvin 360 UV stabilizer and Chimassorb 944 FDL UV stabilizer each being present at about 0.6 weight percent), Example 1 did show acceptable Delta E values and therefore served as a launching point for Comparative Example H and Example 1 identified below, to adjust to a different color for matching purposes.

Comparative Examples E and F were failures because Tinuvin 234 was used instead of Tinuvin 360, even at two different letdown ratios and even though Chimassorb 944 FDL UV stabilizer was also used.

Comparative Example G used Irgastab™ Antioxidant instead of Songnox™ Antioxidant (to better resist "gas fading") as ingredients but maintained the same usage of Tinuvin 360 UV stabilizer and Chimassorb 944 FDL UV stabilizer. Significantly, without the pigments also present as in the other masterbatches, this un-pigmented compound failed. Thus, Example 2 which restored the pigments to the UV stabilization ingredients yielded an unpredictable result.

From the results of the Comparative Example G and Examples 1 and 2, it can be possible to use any amount of Tinuvin 360 UV stabilizer above about 1 weight percent and preferably above about 1.2 weight percent of the total compound. Likewise, it can be possible to use any amount of Chimassorb 944 FDL UV stabilizer above about 1 weight percent and preferably above about 1.2 weight percent of the total compound. At some level of both UV stabilizers, their cost will exceed their benefit. For purposes of this invention, any amount above about 1 weight percent and that excessive amount for either UV stabilizer is considered "effective."

It should also be noted that all masterbatches except M-1 utilized a weather-resistant titanium dioxide pigment, Tiona™ 696 pigment. A weather-resistant white pigment is required for these formulations but may not be required for other formulations to be established using this invention.

Without undue experimentation, a person having ordinary skill in the art can utilize TPE compounds having UV resistance unexpectedly found from the use of Tinuvin 360 UV stabilizer and Chimassorb 944 FDL UV stabilizer to make insulation or jacketing for protected electrical line (wire, cable, or both) which can pass the UL 62 test and have less than 1 Delta E color variation after 10 days of QUV testing according to ASTM D4587 (UVA, 340 nm, 0.77 watt/m², 60° C. for 8 hours light and 50° C. for 4 hours dark condensation). Also, these Examples inform the art of these compounds being suitable for injected molded TPE-based plastic articles which need flame retardance and UV resistance.

The invention is not limited to the above embodiments. The claims follow.

What is claimed is:

1. A thermoplastic elastomer composition, comprising:
   (a) from about 10 to about 60 weight percent, by weight of the composition, of a polyphenylene ether;
   (b) from about 10 to about 60 weight percent, by weight of the composition, of a hydrogenated styrenic block copolymer;
   (c) from about 5 to about 30 weight percent, by weight of the composition, of at least one solid non-halogen flame retardant selected from the group consisting of organo-phosphinate, melamine polyphosphate, and combinations thereof;
   (d) from about 5 to about 40 weight percent, by weight of the composition, of a nucleated olefinic polymer;
   (e) from about 1 to about 2 weight percent, by weight of the composition, of 2,2'-methylene-bis(6-(2H-benzotriazol-2-yl)-4-(1,1,3,3-tetramethylbutyl))-phenol;
   (f) from about 1 to about 2 weight percent, by weight of the composition, of Poly[[6-[(1,1,3,3-tetramethylbutyl) amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]); and
   (g) from about 2 to about 10 weight percent, by weight of the composition, of titanium dioxide pigment.

2. The thermoplastic elastomer composition of claim 1, wherein the hydrogenated styrenic block copolymer has a weight average molecular weight of between about 70,000 and about 160,000 and a ratio of styrenic end-block to olefinic mid-block ranging from about 20/80 to about 40/60,
   wherein the composition further comprises plasticizing oil, and
   wherein the composition further comprises tackifier.

3. The thermoplastic elastomer composition of claim 1, wherein the hydrogenated styrenic block copolymer is selected from the group consisting of styrene-ethylene-butylene-styrene block copolymers, styrene-ethylene-propylene-styrene block copolymers, hydrogenated styrene-isoprene block copolymers, hydrogenated styrene-butadiene block copolymers, and styrene-ethylene-ethylene-propylene-styrene block copolymers, and combinations of them.

4. The thermoplastic elastomer composition of claim 1, wherein the polyphenylene ether is unblended or blended with an aromatic vinyl group thermoplastic resin.

5. The thermoplastic elastomer composition of claim 4, wherein the polyphenylene ether is selected from the group consisting of poly(2,6-dimethyl-1,4-phenylene ether), poly (2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly(2,6-dibenzyl-1,4-phenylene ether), poly (2,5-dimethyl-1,4-phenylene ether), and combinations thereof.

6. The thermoplastic elastomer composition of claim 5, wherein the aromatic vinyl group thermoplastic resin is selected from the group consisting of homopolymers of styrene or its derivatives, copolymers of styrene and p-methyl styrene, copolymers of styrene and alpha-methyl styrene, copolymers of styrene and alpha-methyl-p-methyl styrene, copolymers of styrene and chlorostyrene, copolymers of styrene and bromostyrene, and combinations thereof.

7. The thermoplastic elastomer composition of claim 1, wherein the solid non-halogen flame retardant is an organo-phosphinate and wherein the composition further comprises polyammonium polyphosphate.

8. The thermoplastic elastomer composition of claim 1, wherein the nucleated olefinic polymer is nucleated polypropylene homopolymer.

9. The thermoplastic elastomer composition of claim 1, wherein the composition further comprises one or more additives selected from the group consisting of adhesion promoters; antioxidants; biocides, antibacterials, fungicides, and mildewcides ; anti-fogging agents; anti-static agents; bonding, blowing or foaming agents; dispersants; fillers or extenders; smoke suppressants; expandable char formers; impact modifiers; initiators; lubricants; micas; processing aids; release agents; silanes, titanates or zirconates; slip or anti-blocking agents; stabilizers; stearates; tackifiers; viscosity regulators; waxes; and combinations of them.

10. The thermoplastic elastomer composition of claim 1 in the form of an insulation layer enveloping a protected electrical line or in the form of a jacketing layer enveloping a protected electrical line.

11. A plastic article made from the thermoplastic elastomer composition of claim 1.

12. The plastic article of claim 11, wherein the plastic article has a Delta E color variation of less than 1 after 10 days of QUV testing according to ASTM D4587 (UVA, 340 nm, 0.77 watt/m², 60° C. for 8 hours light and 50° C. for 4 hours dark condensation).

13. The plastic article of claim 11, in the form of an electrical part or an electronic part.

14. A protected electrical line, comprising:
   (a) wire or cable having an axial length and
   (b) at least one layer of the thermoplastic elastomer composition of claim 1 enveloping the axial length of the wire or cable.

15. The protected electrical line of claim 14, wherein the protected electrical line has a Delta E color variation of less than 1 after 10 days of QUV testing according to ASTM D4587 (UVA, 340 nm, 0.77 watt/m², 60° C. for 8 hours light and 50° C. for 4 hours dark condensation).

16. The protected electrical line of claim 14 in the form of a wire.

17. The protected electrical line of claim 14 in the form of a cable.

* * * * *